United States Patent [19]

Prodel et al.

[11] Patent Number: 4,519,491
[45] Date of Patent: May 28, 1985

[54] APPARATUS FOR THE ASSEMBLY AND/OR MACHINING OF CIRCULATING AND IMMOBILIZABLE PARTS CARRIED BY PALLETS

[76] Inventors: Maurice Prodel, 153, rue de Verdun; Jacques Prodel, Rue de Cuts, both of Carlepont 60170 Ribecourt, France

[21] Appl. No.: 311,117

[22] Filed: Oct. 14, 1981

[30] Foreign Application Priority Data

| Oct. 14, 1980 [FR] | France | 80 21976 |
|---|---|---|
| Apr. 8, 1981 [FR] | France | 81 07088 |
| Sep. 11, 1981 [FR] | France | 81 17272 |
| Oct. 9, 1981 [FR] | France | 81 19109 |

[51] Int. Cl.³ .......................................... B65G 37/00
[52] U.S. Cl. ................................. 198/349; 198/472; 198/580; 104/165
[58] Field of Search ............. 198/472, 580, 349, 648, 198/725, 457, 604, 605, 370, 371, 626, 790; 104/185, 186, 187, 198, 199, 165; 414/235–238

[56] References Cited

U.S. PATENT DOCUMENTS

| 2,837,223 | 6/1958 | Wolff | 414/237 |
|---|---|---|---|
| 3,221,754 | 12/1965 | Robson et al. | 198/472 X |
| 3,272,240 | 9/1966 | Roth | 198/472 X |
| 3,313,393 | 4/1967 | Solski et al. | 198/472 |
| 3,530,571 | 9/1970 | Perry | 198/349 |
| 3,934,700 | 1/1976 | Schubert et al. | 198/472 X |
| 4,014,428 | 3/1977 | Ossbahr | 198/472 |
| 4,019,623 | 4/1977 | Tassi et al. | 198/457 |
| 4,040,533 | 8/1977 | De Boer et al. | 198/472 |
| 4,074,805 | 2/1978 | Bodewes | 198/790 |

FOREIGN PATENT DOCUMENTS

| 0013733 | 3/1973 | European Pat. Off. . | |
|---|---|---|---|
| 2106595 | 10/1972 | Fed. Rep. of Germany . | |
| 2644136 | 4/1978 | Fed. Rep. of Germany | 198/472 |
| 2752268 | 6/1979 | Fed. Rep. of Germany . | |
| 1376066 | 9/1964 | France . | |
| 1549729 | 12/1968 | France . | |
| 2284379 | 4/1976 | France . | |
| 2306788 | 11/1976 | France . | |
| 2338200 | 8/1977 | France . | |
| 2369906 | 6/1978 | France . | |
| 2417238 | 9/1979 | France . | |
| 2491897 | 4/1982 | France . | |
| 2503679 | 10/1982 | France . | |
| 865417 | 4/1961 | United Kingdom . | |
| 2040244 | 8/1980 | United Kingdom . | |

OTHER PUBLICATIONS

Soviet Work of N. H. Voronine et al., 1979, p. 161.
Soviet Authors Certificate No. 779,018.
Soviet Work of V. A. Yakhimovitch, "assembly-line . . . ." 1979, pp. 17–25.

Primary Examiner—Joseph E. Valenza
Assistant Examiner—Jonathan D. Holmes
Attorney, Agent, or Firm—Sandler & Greenblum

[57] ABSTRACT

Apparatus for the assembly and/or machining of parts manually and/or automatically, comprising a multiplicity of work stations with means for the displacement of the part-carrying pallets to the interior of a station and from one station to another by one or more carriages in continuous movement in which the movement of a pallet by a carriage occurs along one edge.

12 Claims, 28 Drawing Figures

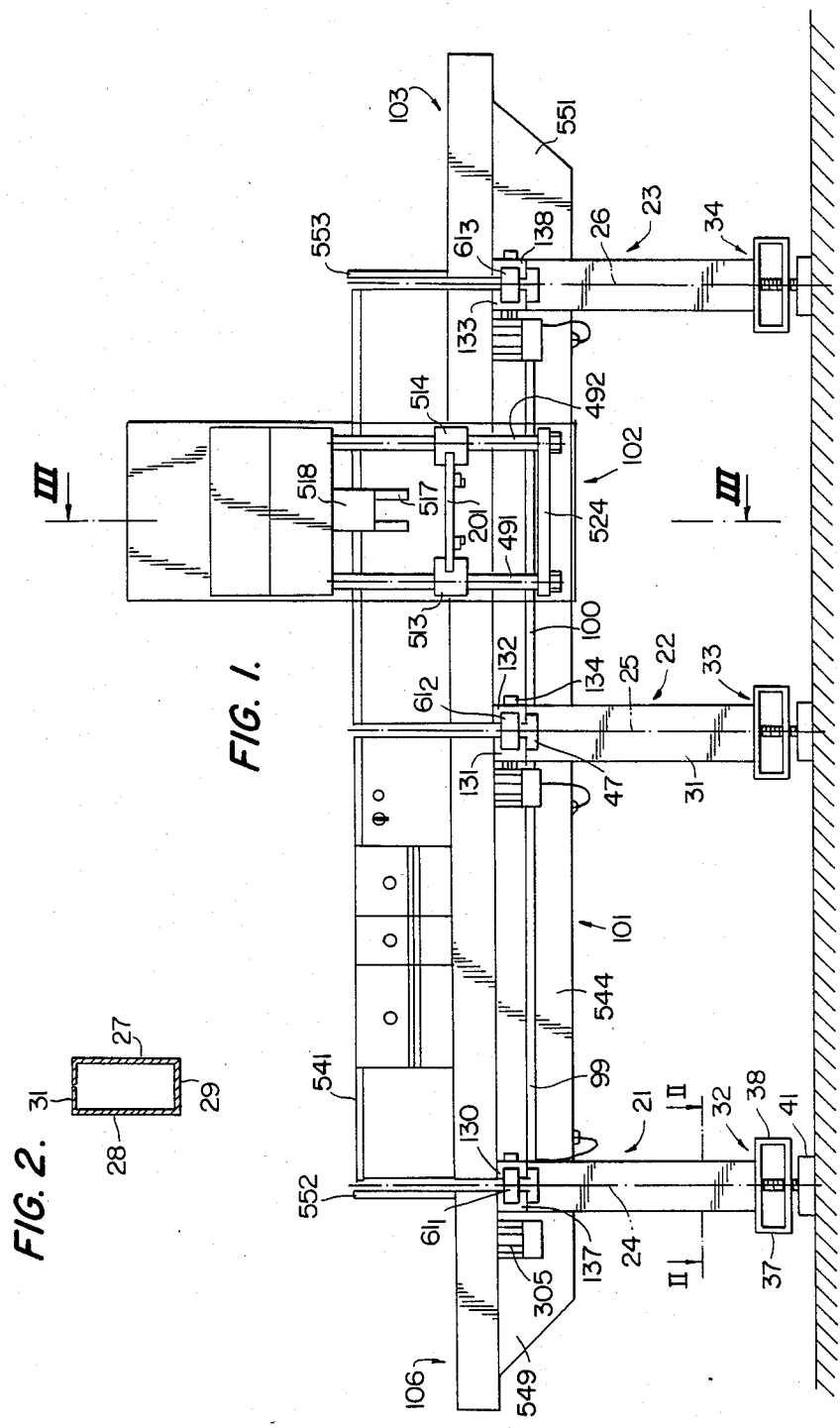

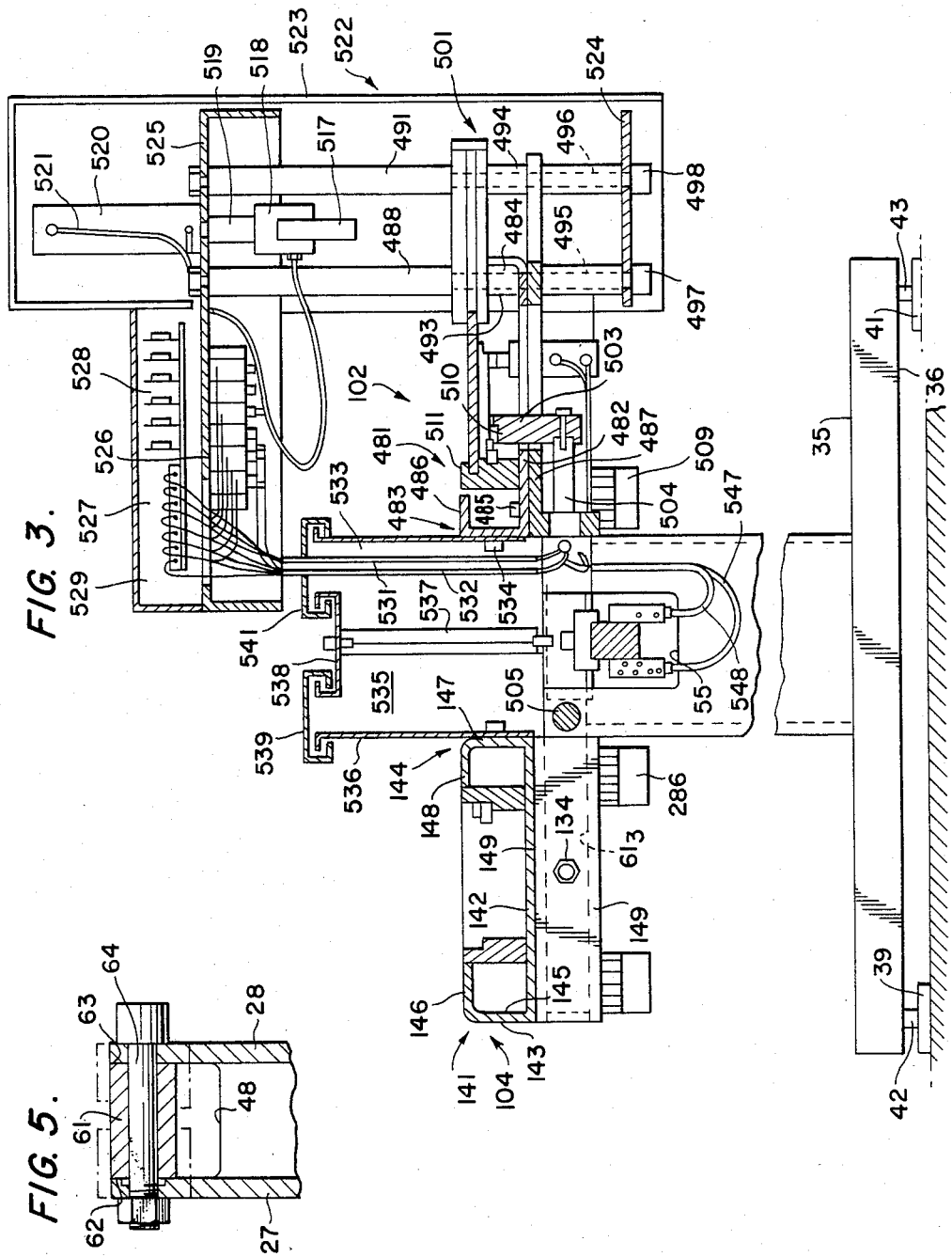

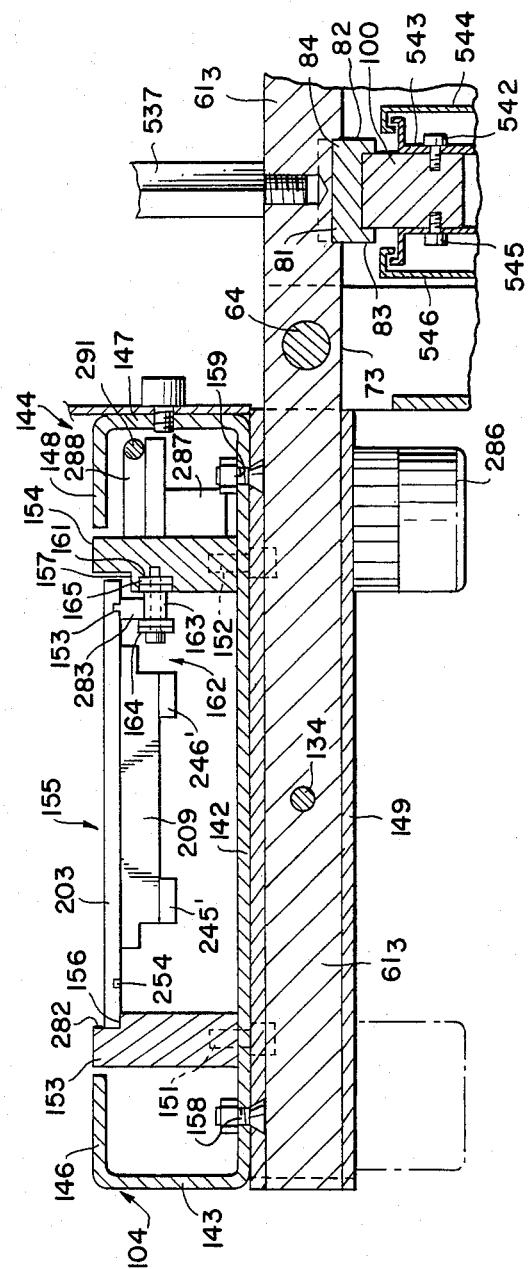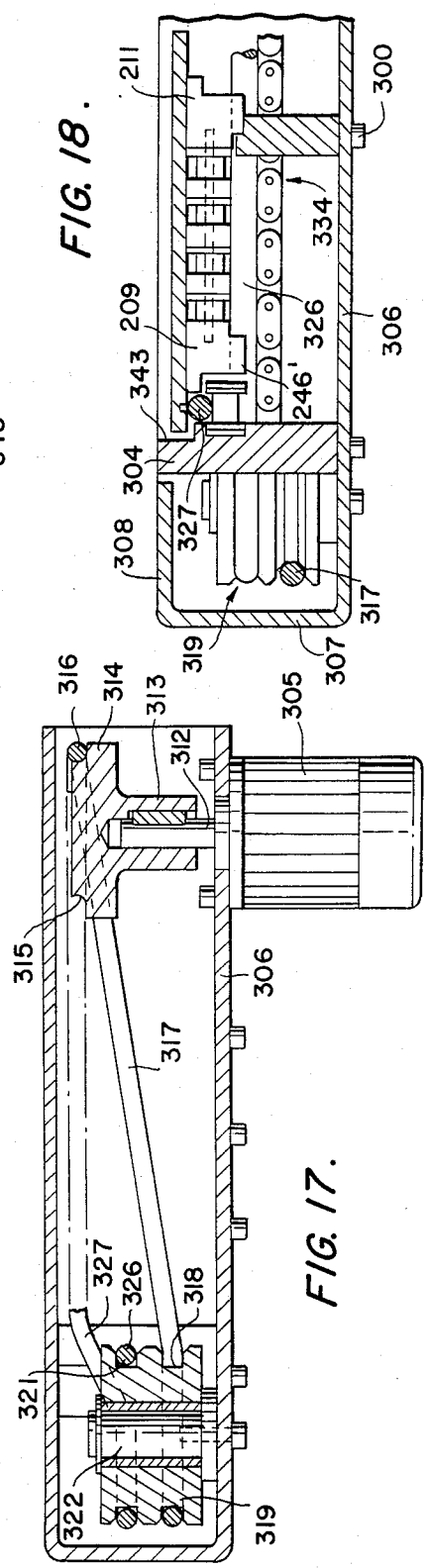

APPARATUS FOR THE ASSEMBLY AND/OR MACHINING OF CIRCULATING AND IMMOBILIZABLE PARTS CARRIED BY PALLETS

The invention relates to an apparatus for the assembly and/or machining of parts.

For obtaining mechanical parts, particularly parts of small dimensions, one is forced, since several years, to break down the manufacture into a succession of operations which can each be performed rapidly and easily by the personnel or in an automatic fashion, and this with the aim of abundant production and at a low price.

Each of the operations is performed at a predetermined work post, some of the posts being operated manually and other posts being automatic, and the parts are transferred automatically from one post to another post.

The purpose of the invention is to furnish an apparatus of this type which operates under optimal conditions of safety for the personnel and of the regularity as to the manufacture, which is relatively inexpensive and thus finds a wide application.

Another aim of the invention is to allow for the adaptation of an installation having various fabrications and this with a minimum of transformations, thus making it possible to undergo variations in time due to customer demand.

Such installations, sometimes known as flexible shops, thus make it possible to manufacture parts economically, even if the total number of parts of a certain type to be produced is not considerable, the adaptation of the installation to the fabrication of a different part requiring only expenditures of an acceptable level.

The installation according to the invention is of the type which comprises means which move in a continuous manner to drive part supports or pallets, these means being utilized to move a pallet from one post to another post, and also to bring one or more selected pallets into positions in which the manual or automatic assembly and/or machining occurs.

It is directed particularly to an apparatus of the type in which the driving of a pallet occurs by means of an endless carriage in continuous displacement, and it is characterized by the fact that the cooperation of the carriage with the pallet occurs along an edge or margin of the pallet, such that a displacement of the pallet transverse to its longitudinal circulation movement is achieved without difficulties, thus making possible, either to bring the pallet into an operational position, from the point of view of the assembly or the machining of the part which it carries, or to bring it into a position of cooperation with a carriage cable adapted to drive it along a trajectory having a direction perpendicular to that of the preceding trajectory. It is thus through an edge perpendicular to the first edge that the driving of the pallet occurs.

Throughout the course of these longitudinal and/or transverse displacements, a pallet preserves the same direction in a horizontal plane.

The cooperation of the pallet with the carriage, for its drive, occurs preferably by means of the lower surface thereof, over a marginal zone.

To respond to the needs of automation of the operation of the apparatus, the pallet comprises on its lower surface of the coding elements whose position is provided to characterize the treatment to which the part carried by the pallet is to be subjected.

According to one characteristic of the invention, these elements are carried by two parallel supports, perpendicular to the margin provided for the longitudinal driving of the pallet and them also disposed along the margin. The space between the two supports is without obstacles, thus permitting for the transverse movement of the pallet to occur. On the other hand, the major portion of the lower surface of the pallet is thus free and can thus preferably serve for the support of an anvil. The pallet is thus perfectly adapted for the role of supporting a part which must be treted by a tool exerting on the part a vertical force, such as a drilling machine, a riveting machine, etc.

According to the invention, likewise, the lower surfaces of the two supports are provided for driving the pallet in the transverse movement by cooperation with a drive carriage.

The invention relates to an apparatus in which, at the intersection of two perpendicular passages, support blocks positioned at a fixed end contribute to the support and to the guidance of the pallet driven along one edge.

According to one embodiment, the support and guidance of the pallet on the blocks occur by means of hubs depending from the supports.

The invention provides that at least one hub of a pallet carries a sticker adapted to cooperate with detectors of fixed location on the end.

According to the invention, likewise, means are provided to make the pallet cooperate, at a predetermined location of its passage where are found a first passage and a second passage, perpendicular to the first, that the pallet can go along its downstream direction, either with a first cable of the carriage, or with a second cable of a carriage perpendicular to the first cable, the second carriage cable being rendered operational by its own rise which places it in contact with a drive surface of the pallet at a higher level than that which cooperates with the first cable.

A pallet can be driven in one direction or in a perpendicular direction, while nevertheless remaining in the same horizontal plan.

An apparatus adapted to several types of operation is composed of a multiplicity of mechanical assemblies or modules and the invention provides that the same frame is adapted to receive modules of different types for this adaptation.

According to one embodiment, the frame comprises cross beams and each of the modules has means allowing for it to be moved on the cross beams in the manner of a drawer and disengaged according to a reverse movement.

Preferably, the same cross beam serves for the assembly of adjacent modules, eliminating by the same the problem of the adjustment of height of the said modules imposed for the passage of the pallets from one module to an adjacent module.

The description which follows, given by way of example, refers to the annexed drawings, in which:

FIG. 1 is an elevational view of an apparatus according to the invention, for one embodiment;

FIG. 2 is a cross sectional view along line II—II of FIG. 1;

FIG. 3 is a vertical cross sectional view along line III—III of FIG. 1 or of FIG. 7, but on a larger scale;

FIG. 5 is a cross sectional view through a vertical longitudinal plane of the upper portion of a foot, to the right of an assembly means with a cross beam;

FIG. 14 is a view in vertical transverse cross section at the level of a rapid return module for the pallets;

FIG. 17 is a cross sectional view along line XVII—XVII of FIG. 15;

FIG. 18 is a cross sectional view along line XVIII—XVIII of FIG. 15;

Figure 4:
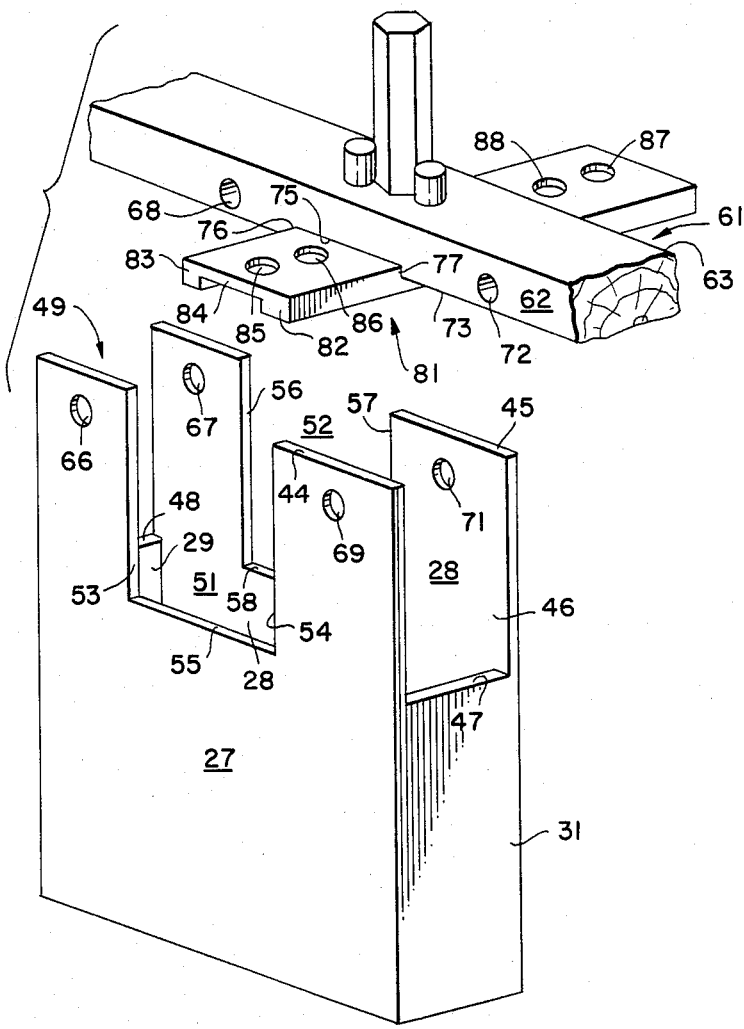
FIG. 4 is a partial perspective view of one portion of the frame, certain of the elements being spaced with respect to one another, for a better understanding.

The flexible shop comprises, in the embodiment shown, a frame constituted by three feet, 21, 22, 23 (FIG. 1), of which the median vertical lines 24, 25, 26 are coplanar. Each foot is tubular and has, in transverse cross section, a rectangular configuration, thus having an anterior surface 27, a posterior surface 28 and two lateral surfaces 29, 31 (FIG. 2). Each foot is preferably obtained by the folding of an initially planar sheet of metal.

Each foot is erected on a base, respectively 32, 33, 34, tubular, having a rectangular transverse cross section, each having an upper surface 35 (FIG. 3), a lower surface 36 and lateral surfaces 37 and 38. The support on the ground, for each base, by means of two discs or end dampers 39, 41 integral with threaded shafts, respectively 42, 43, cooperating with a threading for horizontal adjustment.

The anterior wall 27 of a foot does not extend until the upper transverse edges 44, 45 (FIG. 4), thus providing an inlet 46 defined by a lower edge 47. Likewise, the posterior wall 28 of the foot does not extend until edges 44 and 45 but only until an intermediate edge 48, thus providing another inlet 49. The lateral walls 29 and 31 of a foot have two large grooves 51, 52 defined by edges 53, 54, 55, and 56, 57, 58 respectively, the edges 53 and 56 being coplanar, as well as edges 54 and 57 and edges 55 and 58, respectively.

In the space between the lateral walls 29 and 31, at the upper portion thereof, is lodged a cross beam 61 having a rectangular transverse cross section, the opposite surfaces 62 and 63 (FIG. 4) of the said cross beam facing respectively internal surfaces of the lateral walls 29 and 31. The attachment is obtained by bolts 64, 65 (FIG. 5), the bolt 64 extending through holes 66 and 67 of walls 29 and 31 as well as a hole 68 of the cross beam 61, the bolt 65 extending through holes 69 and 71 of walls 29 and 31 as well as a hole 72 of cross beam 61.

The lower surface 73 of cross beam 61 has a cutout 74 having an upper horizontal surface 75 and vertical surfaces 76 and 77. In the said cutout is lodged the upper median portion of a short longitudinal hat 81 having a "U" shaped transverse cross section having an anterior arm 82, a posterior arm 83 as well as a horizontal body 84, this latter being pierced towards each of its ends by its holes, respectively 85, 86 and 87, 88.

Figure 6:
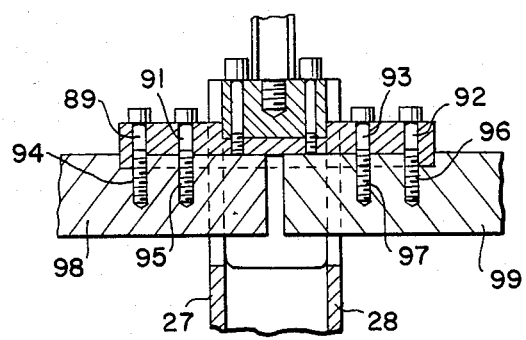
FIG. 6 is a vertical longitudinal cross sectional view illustrating the assembly of a foot, a cross beam and main beams.

These holes serve as bolt passages, respectively 89, 91 and 92, 93 (FIG. 6) which serve for the attachment, by tapped holes 94, 95 and 96, 97 which they have, of main beams 98, 99 respectively.

The frame of the flexible shop thus comprises feet, at right angles of each foot cross beams of which each is directed towards the front and towards the rear from a median longitudinal plane 90, as well as reinforcement main beams.

Figure 7:
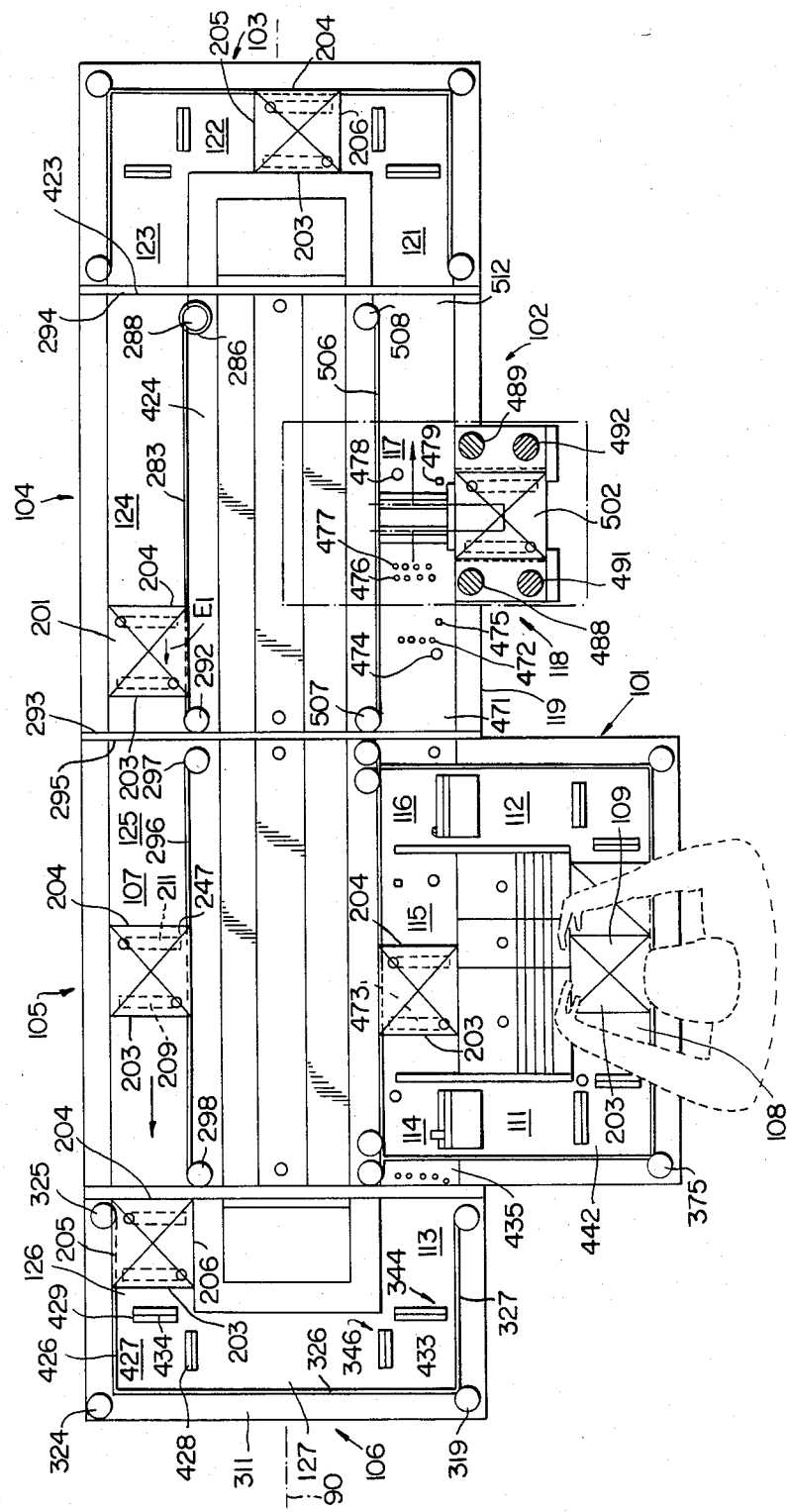
FIG. 7 is a planar view corresponding to FIG. 1.

The cross beams serve for the removable assembly of assemblies or modules which, in the embodiment shown, are in the number of six, i.e., a module 101 (FIG. 7) for manual assembly, a module 102 for assembly or automatic machining, a first angular return module 103, a first rapid rectilinear return module 104, a second rapid rectilinear return module 105 and a second angular return module 106.

The module 101 provides, for the part-carrying pallets (described in detail below), an anterior passage 108 in which the piece or pieces carried by a pallet, as shown at 109 can be assembled or otherwise treated manually (the operator, or female operator, is shown in chain lines). The passage 108 is fed with pallets from a passage 111 which is perpendicular to it, which provides the module 101 and the pallets, such as 109, located on the passage 108 can be evacuated by a passage 112 of the said module, perpendicular to the passage 108.

A pallet arrives at passage 111 of the module 101 from a passage 113, perpendicular to the passage 111, provided by the module 106. The end upstream of the passage 111 constitutes an intersection 114 which is within the extension of the passage 113.

Module 101 likewise provides a posterior passage 115 in alignment with passage 113 and whose downstream end forms, with the downstream end of the passage 112, an intersection 116.

The module 102, adjacent to the module 101, provides a passage 117 in the alignment of the passages 113 and 115, which has control over the entire length of the module 102, and at mid-length of the said passage the said module has an automatic assembly or machining post 118 projecting frontwardly with respect to the front surface 119 of the said module.

The module 103 has a passage 121, extending the passage 117 and in alignment therewith, and which is followed by a perpendicular passage 122, this one followed by a passage 123 perpendicular to the passage 122 and thus parallel to the passage 121.

The first rapid return module 104 has a passage 124 extending from the passage 123 and in alignment therewith, and thus parallel to the passages 113, 115 and 117.

The second rapid return module 105 provides a passage 125 extending the passage 124 and in alignment therewith, and the passage 125 is extended by a passage 126, in alignment with it, of the second angular return module 106, which likewise has a passage 127 perpendicular to the passage 126, passage 127 being followed by the passage 113 which is perpendicular to it.

Figure 8:
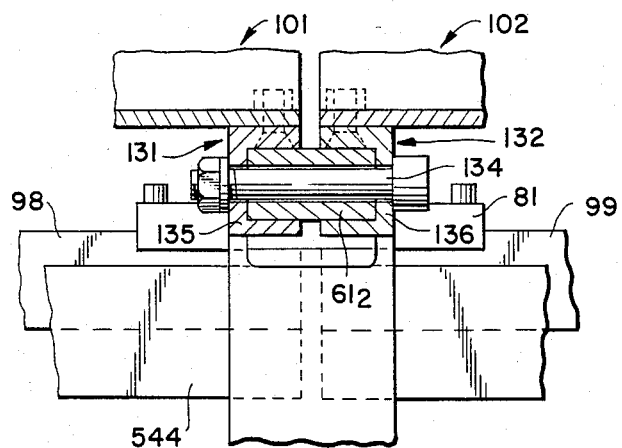
FIG. 8 is a vertical longitudinal cross sectional view illustrating the assembly with a cross beam of two adjacent modules.
Figure 9:
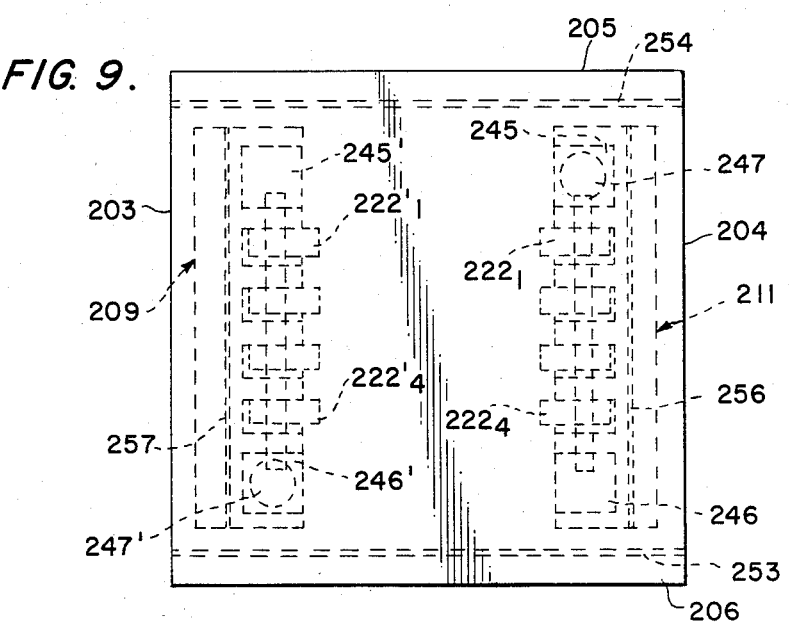
FIG. 9 is a planar view of a pallet along its upper surface.
Figure 16:
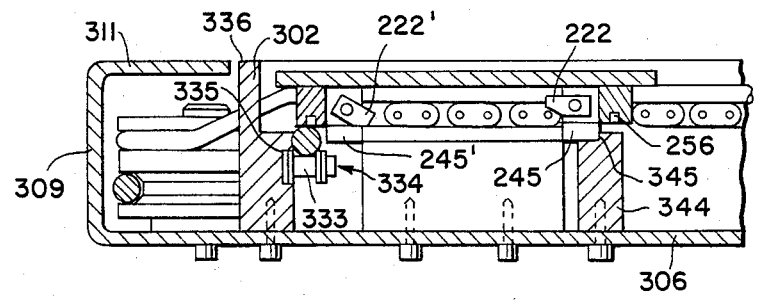
FIG. 16 is a cross sectional view along line XVI—XVI of FIG. 15.

Each of the modules is a mechanical unit which is assembled in the manner of a drawer on the frame. The module 101 is mounted by slides constituted by U irons, 130 and 131 (FIG. 1) which in forming the lateral ends at its lower portion, respectively on the cross beams $61_1$ and $61_2$ integral with the feet 21 and 22. Module 102 is mounted by slides constituted by irons having U cross sections, 132 and 133, on the the cross beams $61_2$ and $61_3$. On cross beam $61_2$, for example, is thus mounted, on its left hand portion, the module 101, while its right hand portion serves for the assembly of module 102. The integration of one and the other of the modules with a cross beam 61 is obtained by bolts 134 which go through both cross beam 61 as well as the bodies 135 and 136 of U irons 131 and 132 (FIG. 8).

The assembly and the attachment of the other modules occurs in an analogous manner.

A U iron forming a portion of module 106 and a U iron forming a portion of module 103 are shown in FIG. 1.

The modules are adapted to provide for the circulation of the pallets or part carriers, to assure their immobilization in predetermined positions, so as to allow for the treatment, manual or automatic, of the parts which they carry. The circulation of the pallets in controlled in a manual or automatic manner as a function of the treatment to be applied to the parts, for the feeding in parts, for the evacuation of parts, along preselected circumstances and under optimum safety conditions both with respect to personnel as well as the parts.

A pallet part carrier 201 (FIGS. 9-13) comprises a pallet body 202 constituted by a metallic plate, of rectangular configuration, having lateral surfaces 203, 204 and 205, 206, upper surface 207 and lower surface 208. By virtue of the fact that, as will be seen below, the orientation of the pallets remains identical, the surface 203 can be called the left surface, the surface 204 the right surface, the surface 205 the rear surface and the surface 206 the front surface, as seen from above.

Figure 10:
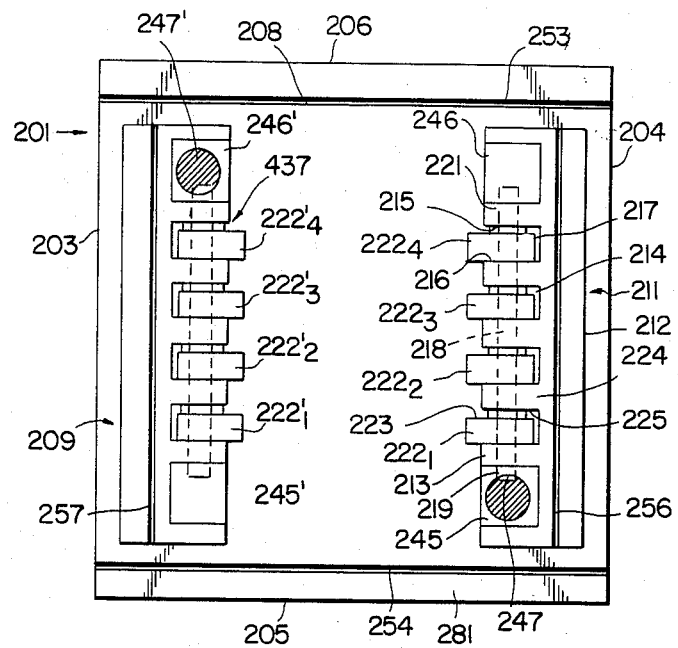
FIG. 10 is a planar view of a pallet along its lower surface.

On the lower surface 208 are attached two supports having a generally parallelpipedic configuration 209 and 211, in respective proximity of the front and rear surfaces 203 and 204. Each support, for example the support 211, has a planar external surface 212 (FIG. 10). Its opposite internal surface 213 is notched, each notch 214, having a rectangular configuration, being defined by two parallel surfaces 215, 216 and an end 217. In the embodiment described, these notches number four for each support. They are traversed by an axis or shaft 218 attached at its ends in the ends 219 and 221 of the block and on which are rotationally mounted, positioned in each of the notches, contact pieces made of ferrous material 222 (FIGS. 12 and 13), likewise numbering four, $222_1$, $222_2$, $222_3$, $222_4$ for the support 211; $222'_1$, $222'_2$, $222'_3$, $222'_4$, for support 209. Between a planar surface of a contact piece and the facing surface 215 of an adjacent flap 224 defining the notch is interposed a joint, for example a toroid 225, made of rubber or the like, having a thickness which is initially greater than the spacing separating the cheek 223 of surface 215, the said joint thus introducing a friction in the rotation of the contact piece 222.

Figures 12, 13:
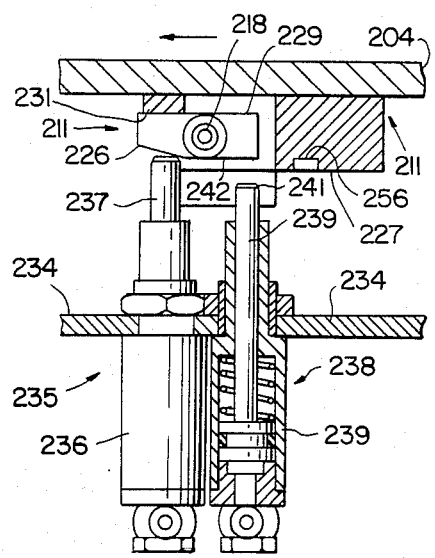
FIG. 12 is a vertical cross sectional view of a portion of a pallet and means for the coding.
FIG. 13 is a vertical cross sectional view of a pallet portion, with a cooperating proximity detector.
Figure 15:
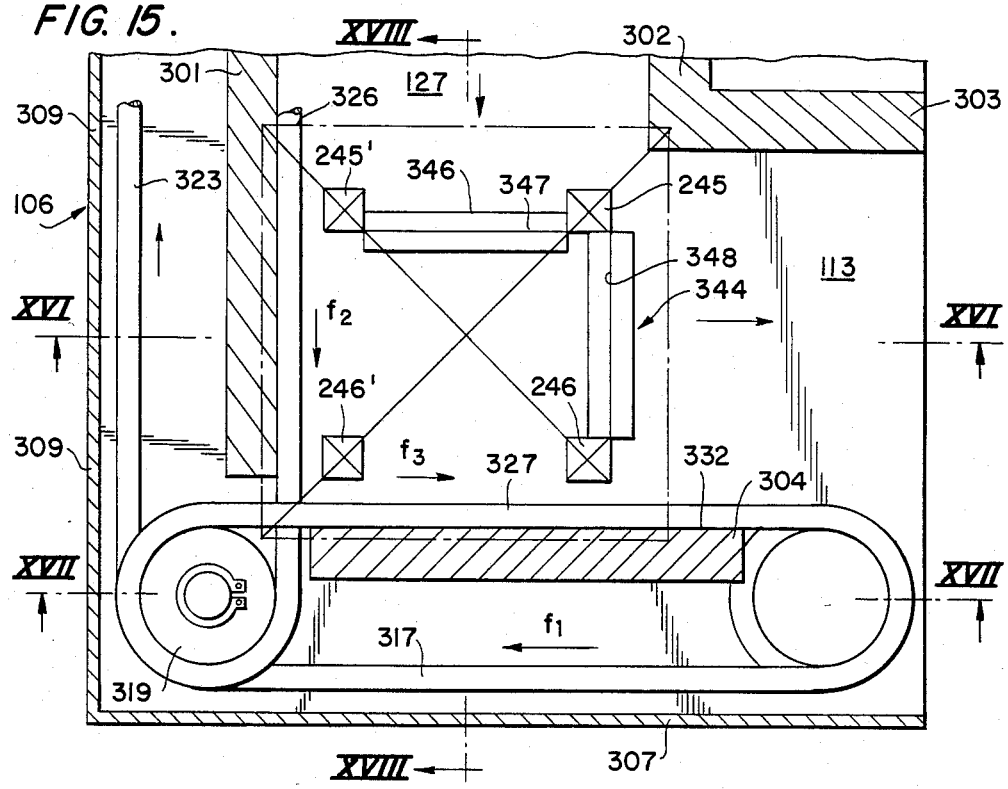
FIG. 15 is a horizontal cross sectional view of a portion of an angular return module.
Figure 20:
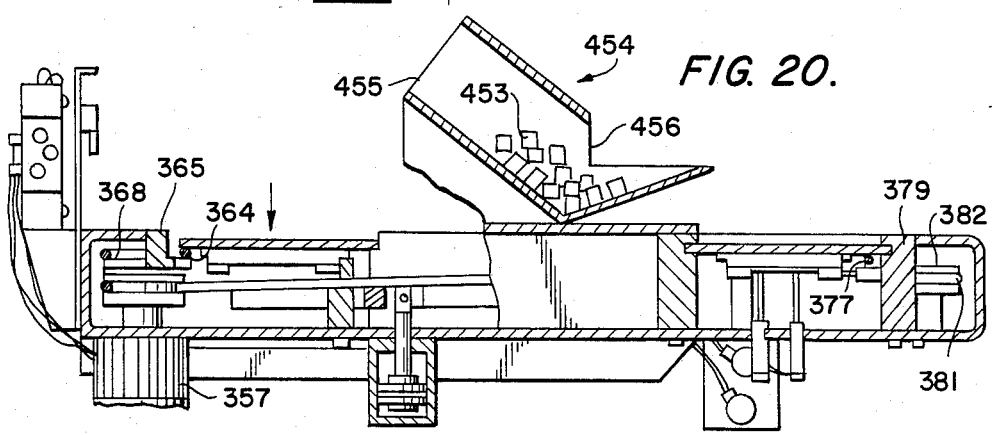
FIG. 20 is a cross sectional view along line XX—XX of FIG. 19.
Figure 21:
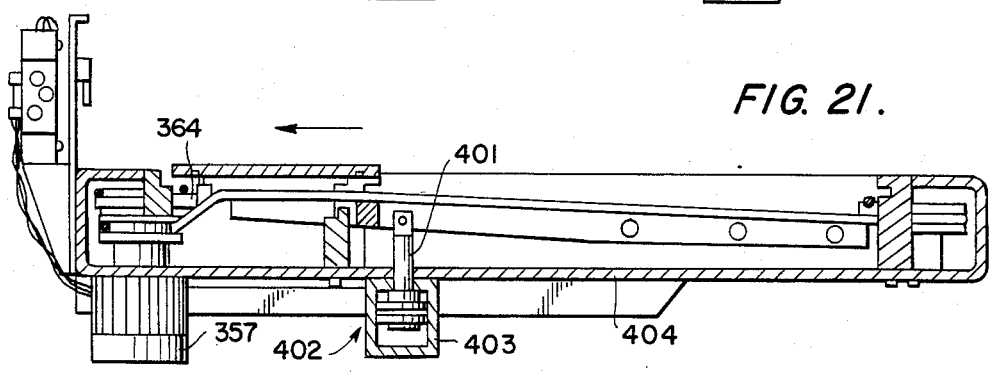
FIG. 21 is a cross sectional view along line XXI—XXI of FIG. 19.
Figure 19:
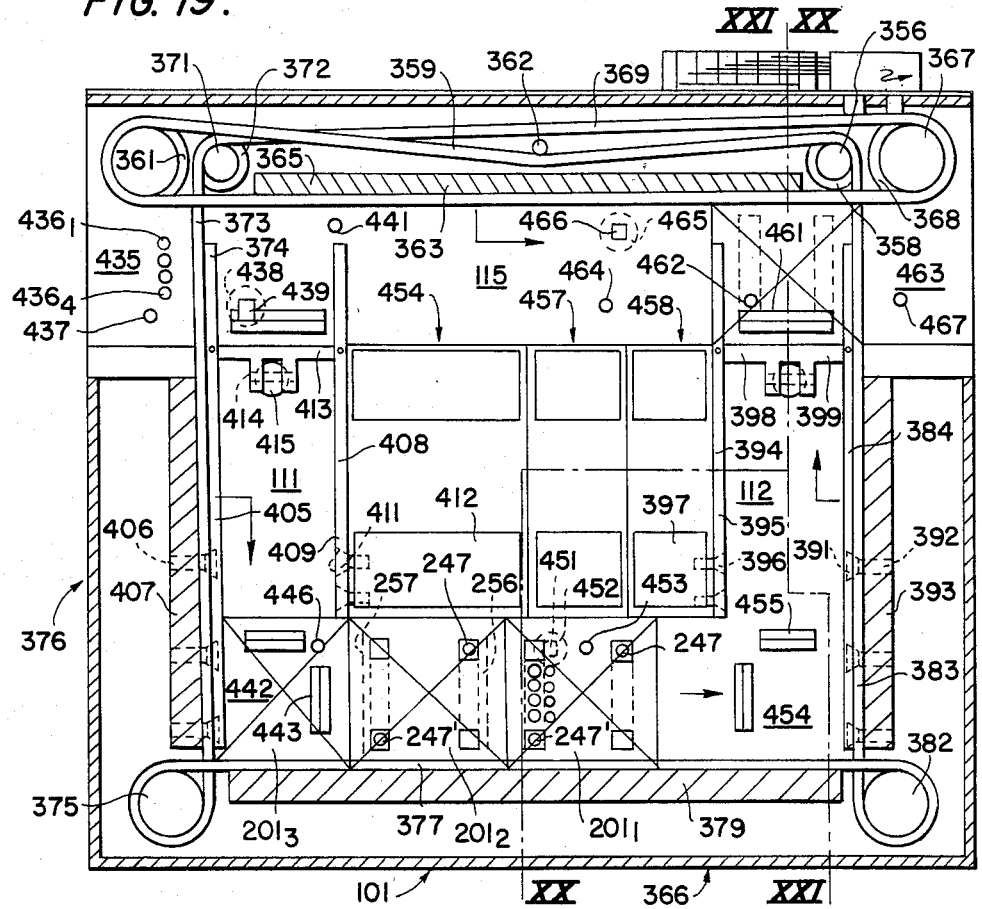
FIG. 19 is a horizontal cross sectional view of a manual assembly module.
Figure 22:
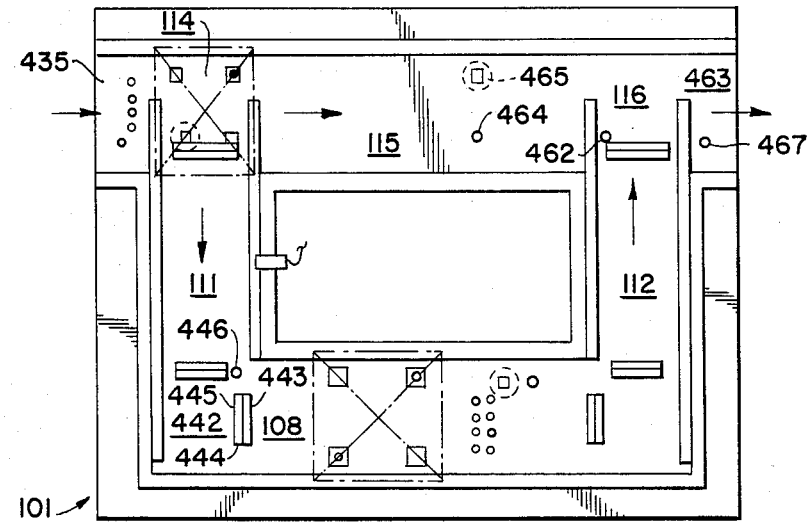
FIG. 22 is a schematic planar view of a manual assembly module.
Figure 23:
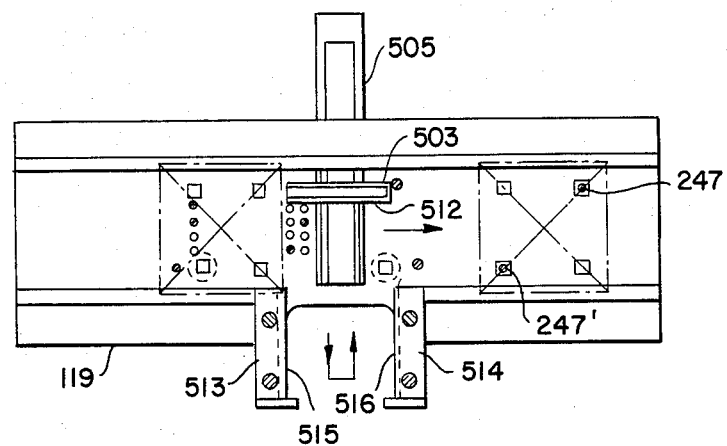
FIG. 23 is a planar schematic view of an assembly and/or automatic machining module.
Figure 24:
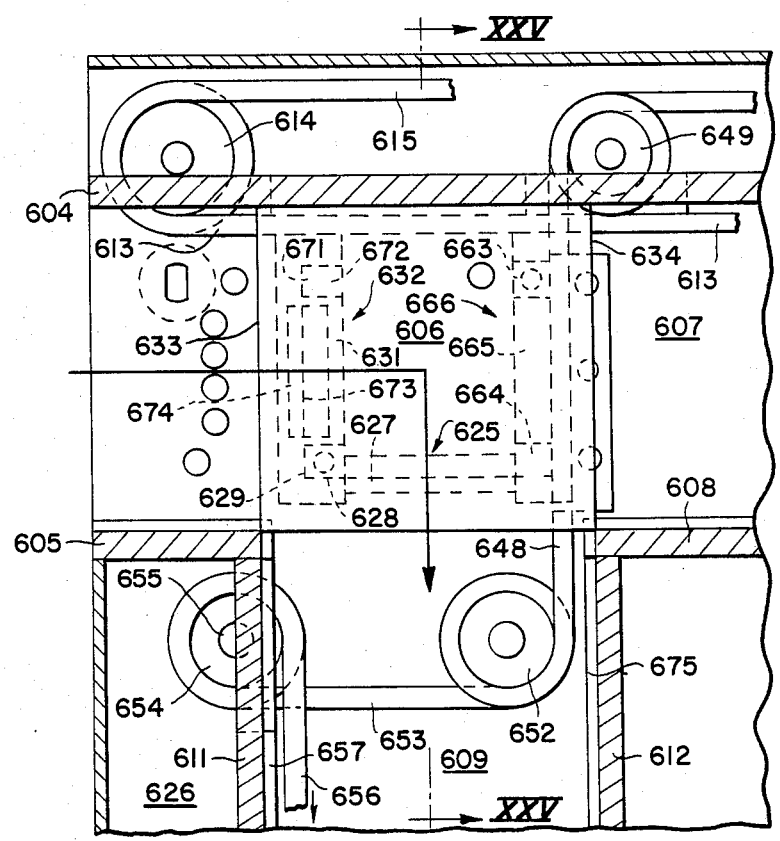
FIG. 24 is a horizontal cross sectional view of a portion of a transfer machine adjacent to an intersection of perpendicular passages.
Figure 25:
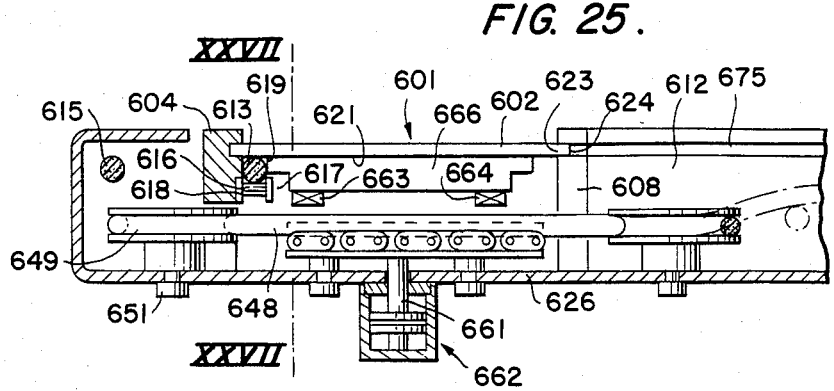
FIG. 25 is a cross sectional view along line XXV—XXV of FIG. 24.
Figure 26:
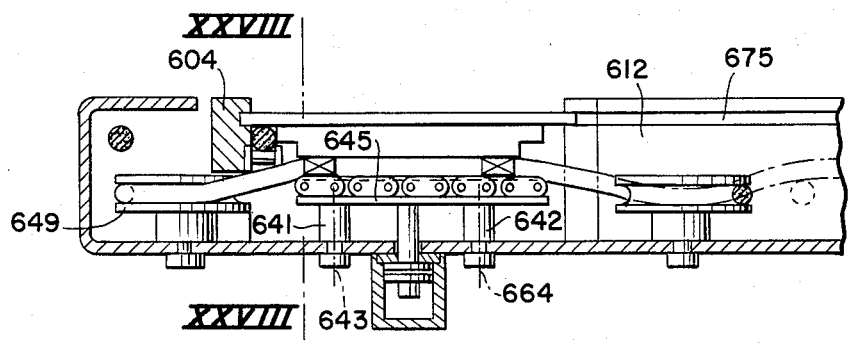
FIG. 26 is a view analogous to FIG. 25, for another condition.
Figure 27:
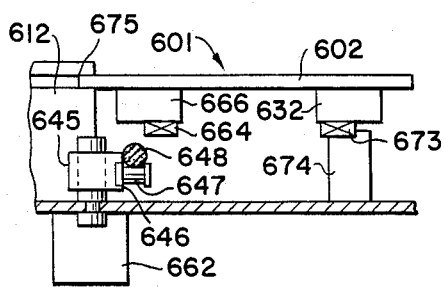
FIG. 27 is a view in cross section along line XXVII—XXVII of FIG. 25.
Figure 28:
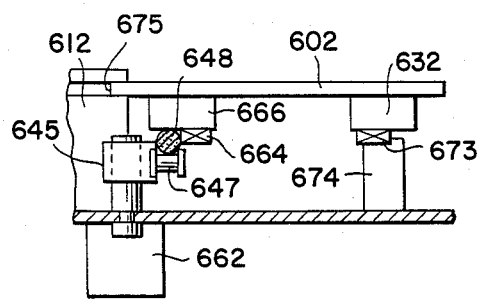
FIG. 28 is a cross sectional view along line XXVIII—XXVIII of FIG. 26.

Such a contact piece has a generally parallelpipedic configuration but has a bevelled surface 226, such that, in an inoperative position, as shown in FIG. 12, the said surface 226 remains beyond the plane extending from the surface 227 of the support 211 opposite to the surface 228 through which it is integral with the surface 208 of the plate 209 constituting the body of the pallet; the contact piece is thus supported by its surface 229, opposite to the surface 226, against a surface 231 of the support 211 (FIG. 12). In the other condition, operational, shown in FIG. 13, the said surface 226 of the said contact piece is in the said plane 227 and adapted to cooperate with a proximity detector 232 which the shaft 233 has fixed on an end or platform 234 of a module when the surface 226 is plum with shaft 233.

In FIG. 12, a small pneumatic jack 235 has further been shown, attached to the platform 234 whose body 236 is below the platform and the movable element 237 above the said platform and which, in the exit position, brings the contact piece 222 into the position where its surface 229 is in contact with the surface 231, i.e., in the inoperative position.

It has likewise been shown on this figure, attached to the platform 234, a second jack 238, whose body 239 is beneath the platform 234 and the movable element 239 above the said platform and which is adapted, by its end 241, to bring a contact piece 222 (situated in front of the contact piece shown in FIG. 12), into a position for which its surface 226 is coplanar with the surface 227 of the support 211, and this by cooperation with the surface 242 of the said contact piece.

At their ends, the supports 209 and 211 extend downwardly by means of hubs of parallelpipedic shape, 245, 246, for the support 211 and 245', 246', for the support 209. On the lower surfaces of the said supports one can glue, or otherwise attach, thin metallic stickers, as shown at 247, 247', particularly along a diagonal disposition.

The entire central portion of the lower surface 202 is free, that is to say without any obstacle or protrusion. The upper surface 207 of the plate is likewise free.

Nearer to its edges 205 and 206, the plate or plank 202 has on its lower surface 208 two narrow rectilinear projections 251 anc 252 (FIG. 11) accommodating two threads 253, 254 made of a material having a friction coefficient greater than that constituting the plate 202, for example, of the rubber type, such as neoprene or the like, whose lower surface is coplanar with the lower surface 208.

The lower surface 227 of each support has a narrow groove 255 (FIGS. 12 and 13) for the lodging of threads 256 and 257 of neoprene or the like, flush with the said lower surfaces 227 and perpendicular to the threads 253, 254.

Alternatively, there are metal channels or a grinding which locally confer to the plate or to the blocks a higher coefficient of friction.

In certain cases, such a grinding is even useless.

Figure 11:
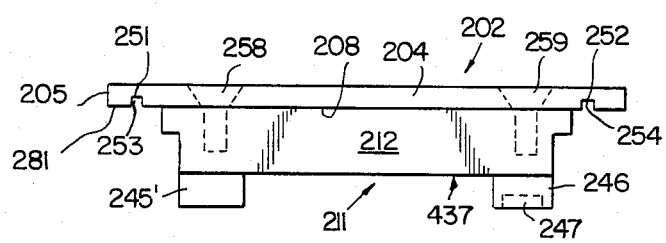
FIG. 11 is an elevational view of a pallet.

The attachment of the blocks 209, 211 to the plate 202 is achieved by screws, as shown at 258, 259 (FIG. 11).

Each of the modules comprises means for the guidance of the pallets, their placement in circulation by means of a single electric motor, means for the reception of the pallets from a preceding module and means for the transfer of the pallets to the following module.

The module 104, or first rapid return module, has (FIGS. 3 and 14) a module body 141 with a platform 142, a posterior or external edge 143 and an internal edge 144, the edge 143 having a vertical wall 145 and a return 146, while the edge 144 has a vertical wall 147 and a horizontal return 148. It is under the platform 142 which is attached to U iron 149 for the assembly and the attachment on the posterior portion of the cross beam $61_3$.

At the end of platform 142 of the module 104 are attached, by screws 151 and 152 rails, respectively 153 and 154, of which the first, posterior or rear, is adapted to guide the pallets as shown at 155. The rail 153 has for this purpose a shoulder 156; the rail 154 also has a shoulder 157 at a level slightly lower than that of the shoulder 156. Screws 158, 159 contribute to the attachment of the U iron 149 to the platform 142 of the module 104. Rail 154 has a slot 161 for the attachment of a roller chain 162 of which each link has two rollers 163 framed by cheeks 164 and 165.

By means of its marginal portion 281, pallet 155 rests on shoulder 156 and is in contact at its rear surface 205 with the surface 282 of the rail 153. On its opposite edge, front, the pallet 155 rests by means of thread 253 against the carriage 283 having a circular cross section itself resting on rollers 163 of roller chain 162. The carriage 283 is driven by an electric motor 286 (FIG. 3) which equips the module 104 and which, through its shaft 287, drives a pulley 288 on which the carriage 283 passes which thus forms two cables, that is to say an operational cable 289 adjacent to the rail 154 and a return cable 291 which need not cooperate with a roller chain, the said carriage passing on a pulley 292 at the end 293 of the module 104 opposite to the end 294 carrying the electric motor 286. The resistance to the displacement of the carriage is relatively very low by virtue of its cooperation with the rollers 163.

The module 105, or second rapid return module, is constituted in an identical fashion to the module 104. The transfer of a pallet of the module 104 to the module 105 occurs without any difficulty, the pallet leaving the module 104 being driven at its inlet into the module 105, at the end 295 thereof, by virtue of a carriage 296 which equips the latter, driven by an electric motor which equips it, and guided by two pulleys 297, 298.

At the outlet of the passage 125 of the module 105, the pallet penetrates into passage 126 of the module 106 which extends the passage 125. This latter comprises means for driving the pallet along a perpendicular movement in the passage 127, then in the passage 113, in a movement perpendicular to that which it has in the passage 127.

FIGS. 15–18 show the portion of the module 106 at the connection of passages 127 and 113. Passage 127 is defined by two transverse rails 301 and 302 (FIG. 15) and the passage 113 by two longitudinal rails 303 and 304. An electric motor 305 (FIG. 17) forms a portion of module 106; it is placed under the lower wall of platform 306 of the said module, at the outlet of passage 123. The said module is further limited by an interior wall 307 extending into an horizontal edge 308, a lateral vertical wall 309 ending in a horizontal edge 311.

On shaft 312 of electric motor 305 is wedged, at its core, a pulley 314. This pulley has a bore 315 at its upper portion and a carriage 316 passes into this bore which has a circular transverse cross section. The cable 317 which leaves pulley 314 circulates in the direction of the arrow $f_1$ (FIG. 15) and arrives at the lower bore 318 of a pulley 319 having two bores. The bore 318 is at the level lower than that of the bore 315 of the motor pulley 314. The bore 318, close to the bottom or platform 306, thus defines a lower level; the second bore, 321, of the said pulley defines an intermediate level and the bore 315 defines an upper level. The pulley 319 is mounted for free rotation around an axis 322.

The cable 317, after having been passed on the pulley 319 in the lower bore 318, is followed by a cable 323 adjacent to the vertical wall 309 and which is at a lower level. After having passed on the lower bore of a pulley 324 (FIG. 7), provided for the connection between the passage 126 and the passage 127, then on a pulley 325 provided at the inlet of the passage 126, after having been again guided over the pulley 324, but over a bore thereof situated at an intermediate level, the carriage returns along a cable 326, which, after engagement in the bore 321, at an intermediate level of the pulley 319 continues by a cable 327 first rising then horizontal, which passes in the bore 315 of the pulley 314 at an upper level to connect itself to the cable 317.

One has thus, over a passage 127 of a horizontal cable 326 of the carriage, adjacent to the rail 301 and circulating in the direction of the arrow $f_2$, at an intermediate level and one has in the passage 113, adjacent to the internal surface 332 of the rail 304, a cable 327, circulating in the direction of the arrow $f_3$, at an upper level. The cable 327 rests on the rollers of the roller chain lodged in a skew notch of the said rail 304.

In the passage 127, a pallet rests by its support 209 on the cable 326 of the carriage, by means of its thread 257, which brings about its movement. The thread 326 rests in turn on the rollers 333 of a roller chain 334 positioned in the slot 335 of the rail 301.

The pallet is thus driven by the cable 326 and its movement is continued until the front thread 253 of the pallet, situated at a level above that of the thread 257, comes against the cable 327 of the carriage which circulates in a direction perpendicular to the displacement of the pallet and cooperates with the said cable to assure the movement of the pallet in a direction perpendicular to that of its anterior displacement, the movement of the pallet in the direction of the said anterior displacement being, if necessary, limited by abutment of its frontal surface 206 against the step 343 of the rail 304.

In the last portion of its displacement in the passage 127, the pallet is supported by cooperation of the lower surface of its hub 246 with a small rectangular block 344 attached on the floor or platform 306 and which has on its upper service a slot 345. At the end of the movement, the hub 246 escapes to the small block 344 (FIG. 15) and the hub 245 is not in a position of cooperation with the block 344, such that this small block 344 does not constitute an obstacle for the displacement of the pallet in the perpendicular direction. During this latter displacement, it is the hub 245' which cooperates with a second small block 346, having a generally perpendicular directhis latter opposing a movement of the pallet transverse to the passage 112. When the pallet reaches the intersection 116 between the passage 112 and the passage 115, the cooperation of its sticker 247' with a detector 462 activates the jack 399 which, by means of the swingle bar 398, permits the blades 384 and 394 to descend, such that the pallet supported by these blades at its thread 254 which comes into contact with the cable 363 of the carriage; the driving of the pallet thus occurs towards the output outlet 463 of the module 101. In the first phase of the movement towards the outlet 463, the pallet is supported and guided by the small rectangular block 461.

The passage 115 towards the posterior edge of the pallet 101, comprises a proximity detector 464 which, by cooperation with a sticker 247' of the pallet, reveals the presence of a pallet in the passage 115 and makes it possible to defer, if necessary, the execution of the advancing order of a pallet beginning at its position of treatment of the part.

The passage 115 likewise comprises, on its platform, a jack 465 whose movable element 466 constitutes an abutment opposing the advancement of a pallet and thus forbidding the progression in the passage 115 as long as necessary to avoid a collision with a pallet leaving the passage 112.

A proximity detector 467 at the outlet 463 of the module 101 makes it possible to verify the complete passage of a pallet in the said outlet.

The pallets coming into module 102 are thus pallets whose pieces which they carry have been treated manually if they have followed the circuit of the passages 111, 108, 102, or not treated manually if they have followed the passage 115.

The module 102 has at its inlet 471 (FIG. 7) a row 472 of holes having proximity detectors adapted to cooperate with the row of contact parts of a pallet; a proximity detector 474 is adapted to cooperate with a sticker 247' of a pallet; the movable element of a jack 475 is provided for the stopping of a pallet upstream of the automatic post 117.

The module 102 likewise comprises two rows of jacks 476, 477 for the activation of the contact parts of a pallet. A proximity detector 478 is adapted to cooperate with a sticker 247 of the pallet and the moavable element 279 of a jack allows for the immobilization of the pallet facing the treatment station.

At the outlet 512 of the module 102, a pallet penetrates into the module 103 through the passage 121 and the circulation in the said module occurs by means analogous to those which have been described for the module 106.

At the outlet of the module 103, through the passage 123, the pallets penetrate into the passage 124 of the first rapid return module 104.

One now refers to FIGS. 24-28.

Part supports or pallets 601 having a plate 602 of rectangular shape arrive by a passage 603, defined by a posterior rail 604 and an anterior rail 605, at an intersection 606 from where a first passage 607 begins extending the passage 603 and defined on the one hand by the posterior rail 604 and on the other hand by an anterior rail 608 and a second passage 608 defined by a left rail 611 and a right rail 612 perpendicular to the rails 604, 605, 608.

When it reaches the intersection 606, the pallet 601 is driven by a cable 613 of a carriage having a circular cross section, for example, made of polyurethane under mechanical tension driven by an electric motor not shown, and originating from a pulley 614 where the cable 615 of the carriage arrives.

The carriage 613 is supported and guided by the rollers 616 of a roller chain 617, attached, lodged in a skew notch 618 of the rail 604.

For driving the pallet 601, the carriage 613 cooperates with a marginal posterior zone 619 of the lower surface 621 of the plate 602.

When the pallet 601 must continue its movement in the extension of the passage 603, that is to say in the passage 607, its movement by the carriage 613 makes it reach the same passage 607 and it is the cable 613 which makes it progress into the said passage, its guidance being assured by cooperation of its anterior margins 623 with a groove 624 presented by the rail 608.

During its movement above the intersection 606, the guidance is assured by a block 625 attached on the end or platform 626 and which has a vertical surface 627 with which cooperates the vertical surface 628 of a hub 629 projecting with respect to the lower surface 631 of a support having rectangular configuration 632 whose general direction is parallel to the left and right edges 633 and 634 respectively of the plate 602.

As the inlet of the passage 607, on the platform 626, two small columns 641 and 642 are erected of which the plane of the axes 643 and 644 is transverse, that is to say, perpendicular to the passages 603 and 607 and along the length of the said small columns is mounted to slide a horizontal bar 645. The said bar, in a generally parallelpipedic shape, carries, on its surface 646, a section of chain rollers 647 and on the said rollers passes the cable 648 of a carriage having circular cross section, which can be or not that which comprises the cables 613 and 615, and beginning with a pulley 649 mounted to freely rotate at its axis 651 on the platform 626. The cable 648 continues until a pulley 652 from where the carriage continues by a cable 653 until a pulley 654 attached by its axis 655 to the right of the rail 611, the cable 656 leaving the pulley 644 adjacent to the internal surface 657 of the said rail and supported by the rollers of a roller chain, not shown, attached on the latter.

The bar 645 is supported at its median portion by the movable element 661 of a jack 662 attached on the platform 626, on the lower surface of the latter.

The condition shown in FIGS. 2 and 4 is that for which the pallet arriving at the intersection 606 through the passage 603 continues its movement in the passage 607, extending the passage 603 under the driving action of the cable 613 as explained above.

If, on the other hand, the pallet arriving by the cable 603 must continue its movement in the passage 609, the jack 662 receives the fluid under pressure and the condition becomes that shown in FIGS. 3 and 5. At the end of its movement at the plum of the intersection 606, the hubs 663 and 664, which project with respect to the lower surface 665 of the right support 666 of the pallet 601, comes into abutment against the cable of the carriage 648 and this is thus adapted to drive the pallet by cooperation with the lower surface 665 of the support, and this along the axis of the passage 609. During the first portion of the movement, the guidance of the pallet occurs by cooperation of the vertical surface 671 of the posterior hub 672 projecting downwardly with respect to the lower surface 631 of the support 632 with the vertical surface 673 which a block 674 attached to the floor 626 presents.

The movement occurs until the lower surface 631 of the support 632 comes to cooperate with the cable 656, the guidance occurring at the opposite edge of the pallet which cooperates with a groove 675 presented by the rails 612.

By the arrangement according to the invention, the movement of the pallet remains purely horizontal, that the pallet, upon leaving a passage arriving at an intersection, continues its movement into the extension of the said passage where, or, on the contrary, continues it along perpendicular passage.

The fact of providing several carriages for driving the pallets in a module forming a portion of the transfer machines makes it possible to accommodate, in a single module, a large number of pallets, without each carriage necessarily being subjected to an excessive tension resulting from the resistances due to the friction of the carriage against the lower surfaces of the movable pallets.

We claim:

1. Apparatus for the assembly and/or machining of parts, manually and/or automatically, comprising a multiplicity of work stations with means for the displacement of pallet part-carriers to the interior of a station and from one station to another by at least one carriage in continuous movement wherein the driving of a pallet by a carriage is done along one edge, the arrangement of the at least one carriage being such that the motor cables of the carriage are at a predetermined level for the driving of a pallet in one direction and at a different level for the driving of a pallet in a perpendicular direction, each station comprising a module mounted in a removable manner on a fixed frame, each module having a generally rectangular configuration, a pulley being provided at each corner of the configuration for the guiding of a said carriage, and the bores of each pulley being at different levels.

2. Apparatus according to claim 1 wherein at the inlet of a module having a plurality of circulation passages the carriage has a cable at a fixed level for circulation in a passage and a cable of variable level for circulation in another passage.

3. Apparatus according to claim 2 wherein the cable of variable level is carried by a bar adapted to be brought to two different levels, one of the levels corresponding to that of a driving cable of a passage and the other to that of a driving of a perpendicular passage, the pallet being displaced along a purely horizontal movement, whether it be in one or the other of the passages.

4. Apparatus according to claim 3 wherein at the upper level the cable carried by the bar comprises an abutment for the hubs of the pallet.

5. Apparatus according to claim 2 wherein one hub carries a positioning sticker.

6. Apparatus according to claim 5 wherein one pallet has two positioning stickers positioned diagonally.

7. Apparatus for manual/automatic assembling/machining of parts which are moved along a pre-determined planar path having parallel and perpendicular portions by at least one generally rectangular pallet, said apparatus comprising means for driving said at least one pallet, said means for driving including a plurality of movable carriage cables adapted to frictionally engage with at least one edge of said at least one pallet, at least one said cable being disposed serially with respect to others of said cables, at least one said cable being disposed in parallel with others of said cables, at least one said cable being disposed perpendicular to others of said cables, such that said cables having frictional engagement with one side, two parallel or perpendicular sides of said at least one pallet are adapted to successively and/or simultaneously drive said at least one pallet at least along said pre-determined path having parallel and perpendicular portions, wherein said means for driving includes a pair of cables for cooperating to simultaneously drive said at least one pallet in an identical direction, said pair of cables comprising a single continuous cable, wherein said at least one pallet comprises a pallet part carrier having a plate and elongated support and driving edges which project downwardly from said plate, wherein an edge of a lower surface of said plate includes a thread having a coefficient of friction greater than that of a material forming said plate.

8. The apparatus as recited in claim 7 wherein said elongated support and driving edges are disposed perpendicularly with respect to said thread.

9. Apparatus for manual/automatic assembling/machining of parts which are moved along a pre-determined planar path having parallel and perpendicular portions by at least one generally rectangular pallet, said apparatus comprising means for driving said at least one pallet, said means for driving including a plurality of movable carriage cables adapted to frictionally engage with at least one edge of said at least one pallet, at least one said cable being disposed serially with respect to others of said cables, at least one said cable being disposed in parallel with others of said cables, at least one said cable being disposed perpendicular to others of said cables, such that said cables having frictional engagement with one side, two parallel or perpendicular sides of said at least one pallet are adapted to successively and/or simultaneously drive said at least one pallet at least along said pre-determined planar path having parallel and perpendicular portions, wherein said means for driving includes a pair of cables for cooperating to simultaneously drive said at least one pallet in an identical direction, said pair of cables comprising a single continuous cable, wherein said at least one pallet comprises a pallet part carrier having a plate and elongated support and driving edges which project downwardly from said plate, wherein two parallel edges of a lower surface of said plate include a pair of parallel threads having a coefficient of friction greater than that of a material forming said plate.

10. The apparatus as recitd in claim 9 wherein said elongated support and driving edges are disposed perpendicularly with respect to said pair of threads.

11. Apparatus for manual/automatic assembling/machining of parts which are moved along a pre-determined planar path having parallel and perpendicular portions by at least one generally rectangular pallet, said apparatus comprising means for driving said at least one pallet, said means for driving including a plurality of movable carriage cables adapted to frictionally engage with at least one edge of said at least one pallet, at least one said cable being disposed serially with respect to others of said cables, at least one said cable being disposed in parallel with others of said cables, at least one said cable being disposed perpendicular to others of said cables, such that said cables having frictional engagement with one side, two parallel or perpendicular sides of said at least one pallet are adapted to successively and/or simultaneously drive said at least one pallet at least along said pre-determined planar path having parallel and perpendicular portions, wherein said means for driving includes a pair of cables for cooperating to simultaneously drive said at least one pallet in an identical direction, said pair of cables comprising a single continuous cable, wherein said at least one pallet comprises a pallet part carrier having a plate and elongaged support and driving edges which project downwardly from said plate, wherein a lower surface of each of said elongated support and driving edges includes a thread having a coefficient of friction greater than that of a material forming said elongated support and driving edges.

12. Apparatus for manual/automatic assembling/machining of parts which are moved along a pre-determined planar path having parallel and perpendicular portions by at least one generally rectangular pallet, said apparatus comprising means for driving said at least one pallet, said means for driving including a plurality of movable carriage cables adapted to frictionally engage with at least one edge of said at least one pallet, at least one said cable being disposed serially with respect to others of said cables, at least one cable being disposed in parallel with others of said cables, at least one said cable being disposed perpendicular to others of said cables, such that said cables having frictional engagement with one side, two parallel or perpendicular sides of said at least one pallet are adapted to successively and/or simultaneously drive said at least one pallet at least along said pre-determined path having parallel and perpendicular portions, wherein said plurality of movable carriage cables includes at least one continuous cable, and wherein said apparatus further comprises an electric motor for driving at least one said carriage cable associated with a segment of said predetermined planar path, said segment having a plurality of parallel and perpendicular portions.

* * * * *